(12) United States Patent
Carpenter et al.

(10) Patent No.: US 8,676,776 B2
(45) Date of Patent: *Mar. 18, 2014

(54) MULTI-PREFIX INTERACTIVE MOBILE SEARCH

(75) Inventors: G. Gregory Carpenter, Laguna Beach, CA (US); Timothy L. Kay, Los Altos Hills, CA (US)

(73) Assignee: Tropare, Inc., Laguna Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/563,660

(22) Filed: Jul. 31, 2012

(65) Prior Publication Data

US 2012/0310924 A1 Dec. 6, 2012

Related U.S. Application Data

(63) Continuation of application No. 11/970,414, filed on Jan. 7, 2008, now Pat. No. 8,255,377.

(51) Int. Cl.
  *G06F 7/00* (2006.01)

(52) U.S. Cl.
  USPC .......................................................... 707/706

(58) Field of Classification Search
  USPC ........................... 707/722, 758, 706, 999.001
  See application file for complete search history.

(56) References Cited

U.S. PATENT DOCUMENTS

| | | | | |
|---|---|---|---|---|
| 4,969,097 | A * | 11/1990 | Levin | 715/234 |
| 6,792,423 | B1 * | 9/2004 | Jeffries et al. | 1/1 |
| 7,228,556 | B2 * | 6/2007 | Beach et al. | 725/53 |
| 7,370,035 | B2 * | 5/2008 | Gross et al. | 1/1 |
| 7,499,940 | B1 * | 3/2009 | Gibbs | 1/1 |
| 8,078,603 | B1 * | 12/2011 | Chandratillake et al. | 707/706 |
| 2006/0075120 | A1 * | 4/2006 | Smit | 709/227 |
| 2006/0129541 | A1 * | 6/2006 | Morgan et al. | 707/3 |
| 2007/0005563 | A1 * | 1/2007 | Aravamudan et al. | 707/2 |
| 2007/0050339 | A1 * | 3/2007 | Kasperski et al. | 707/3 |
| 2007/0055652 | A1 * | 3/2007 | Hood et al. | 707/3 |
| 2007/0060176 | A1 * | 3/2007 | Sloo | 455/466 |
| 2007/0130128 | A1 * | 6/2007 | Garg et al. | 707/3 |
| 2007/0240187 | A1 * | 10/2007 | Beach et al. | 725/53 |
| 2010/0010989 | A1 * | 1/2010 | Li et al. | 707/5 |
| 2012/0173500 | A1 * | 7/2012 | Chakrabarti et al. | 707/706 |

* cited by examiner

Primary Examiner — Mohammed R Uddin

(74) Attorney, Agent, or Firm — BrainSpark Associates, LLC

(57) ABSTRACT

A system and a method are disclosed for multi-prefix, interactive search capability on a mobile communications device. A keystroke is input into a search query field of a landing page and a multi-prefix search is performed. The landing page is refreshed to display the results. The landing page displays a first tier of search results, which can include channels or links to web pages associated with the user input. If the search result that is selected is a channel, the channel is displayed. If the search result that is selected is a web page, the web page is displayed. The landing page corresponding to the selected channel, or to the web page, may then be searched or explored. If the desired channel is not displayed within the first tier of search results, another keystroke may be input. The landing page refreshes accordingly and additional keystrokes may be entered.

8 Claims, 27 Drawing Sheets

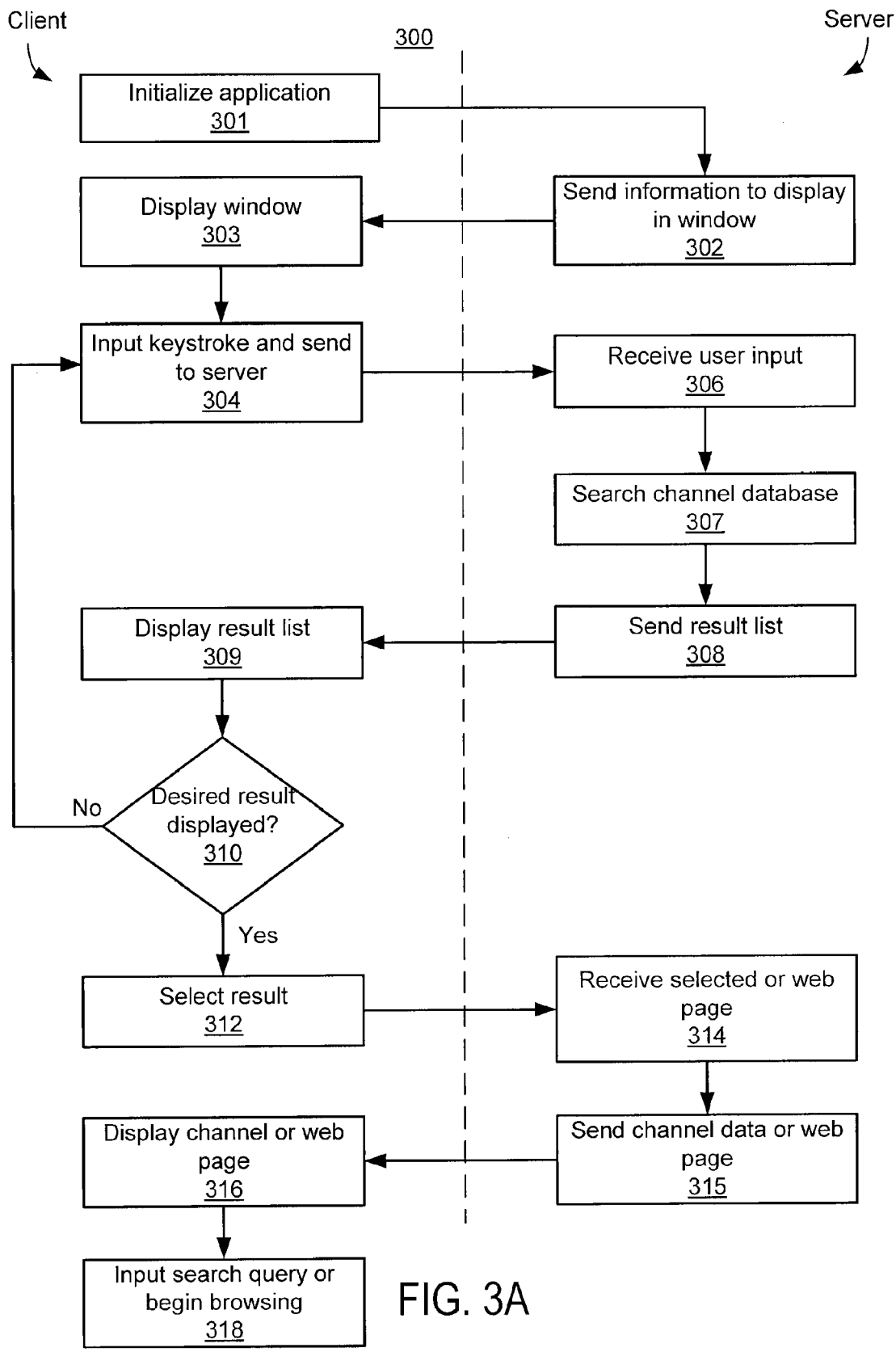

MULTI-PREFIX INTERACTIVE MOBILE SEARCH

CROSS REFERENCE TO RELATED APPLICATIONS

This application claims the benefit (pursuant to 35 U.S.C. §119(e) for provisional patent applications and 35 U.S.C. §120 for non-provisional patent applications) of (i) U.S. patent application Ser. No. 11/970,414 filed Jan. 7, 2008, entitled "Multi-Prefix Interactive Mobile Search" and (ii) U.S. Provisional Patent Application No. 60/883,790, filed Jan. 7, 2007, entitled "Multi-Tier Interactive Mobile Search," the contents of which are hereby incorporated by reference.

BACKGROUND

1. Field of Art

The disclosure generally relates to the field of mobile communications. In particular, the invention relates multi-prefix and interactive search capability on a mobile communications device.

2. Description of Related Art

In the last few years, web-enabled mobile telephones have become enormously popular. More web-enabled mobile phones ship each year than do desktop and notebook computers combined. Such mobile phones are similar to desktop and mobile computers in that they offer display screens, a keyboard, and sometimes, a pointing device. However, because of portability requirements, the capabilities of the displays, keyboards, and pointers on mobile phones are significantly reduced. Displays are relatively small with little area to display content as well as menus, tool bars, and other navigation and status information. The keyboards are often telephone keypads or thumb keyboards. The pointer, when provided, is often a scroll wheel or joy stick that can be used to indicate a direction of movement or pressed to indicate a click. Sometimes, the pointer is simply a set of arrow keys on the keyboard. Furthermore, because of speed and latency issues, navigation between web pages is typically much slower on mobile phones than on desktop and notebook computers.

The human interface limitations of mobile phones, combined with slower navigation, cause significant changes in the ability of a user to interact with web pages. Additionally, because of limitations of the input devices, Hypertext Markup Language (HTML) forms are difficult to use on mobile phones. The difficulties arise in many ways. The keyboard and the pointer are less effective than their counterparts on desktop and personal computers.

Keyboards are less effective because their small form factor makes it more difficult to type characters. In some case, the keyboard is smaller and has fewer keys. The smaller keyboards usually require thumbing: typing with ones thumbs rather than using ten fingers. The reduction in keys makes it more difficult to key in digits and special characters. Some keyboards are telephone dial pads with multiple letters on each key. Various technologies, including triple tap (pressing the same key until the desired letter appears) and predictive text, help to improve the effectiveness of such keyboards, but the effectiveness is still far below that of a full-size keyboard.

The pointer is also less effective. HTML forms often contain multiple input fields and the pointer is used to navigate among them. Pointers on mobile phones, when available, are less effective than pointers or mice used with desktop computers at navigating between the input fields. For example, tabbing between fields using a full-size keyboard enables the field for typing when it has received focus. On a mobile phone, the tabbing is typically done via a directional pad and the field has to subsequently be selected to be enabled for typing. Additionally, on desktop computers, mice can be used to move from one field to another without having to move through the fields in between. On mobile phones, the moving from one field to another is typically done sequentially from one field to the next, without the ability to skip any fields along the way.

The existing technology described above requires more effort to input commands for navigation and is very difficult and cumbersome to use.

SUMMARY

The present invention includes novel concepts such as: multi-prefix searching; multi-tier searching; interactive searching; result delivery searching and mobile device searching. In one embodiment, a system is disclosed for combined multi-prefix and multi-tier searching In a second embodiment, a system is disclosed for multi-prefix, interactive and result delivery searching. In a third embodiment, a system is disclosed for multi-prefix searching adapted for a mobile device.

One embodiment combines these novel concepts in a disclosed system (and method) having multi-tier, multi-prefix, interactive search capability on a mobile communications device. The mobile communications device includes a window, which comprises a search area and a results area. An application is launched and a landing page is displayed in a display area of the mobile communications device. The search area includes a search query field. A keystroke is inputted into a search query field and a multi-prefix search is performed. The landing page within the display area is replaced by the results of the search. The results contain a first tier of search results, which can include channels or links to web pages associated with the user input. If the search result that is selected is a channel, the channel is displayed. If the search result that is selected is a web page, the web page is displayed. In some embodiments, if the search result that is selected is a web page, a separate web browser application is launched and the web page is displayed on the web browser application. The channel or to the web page, may then be searched or explored. If the desired channel is not displayed within the first tier of search results, another keystroke may be inputted. Again, the results page refreshes accordingly and additional keystrokes may be entered until the desired channel is displayed.

The described embodiments provide for multi-prefix, interactive search capability on a mobile communications device. Prefix delimiters denote the beginning of another search prefix. In some other embodiments, space characters may be used as prefix delimiters. In some other embodiments, users may input space character keystrokes as well as alphabetic or numeric keystrokes. In other words, if the search contains multiple words, the user enters one or more prefixes separated by spaces to create a multi-prefix search query. The embodiments described provide the capability for users to enter fewer keystrokes to obtain a desired search result. The search is interactive because a user is provided feedback (the displayed search results are refreshed) with each keystroke. Based on partial query results, a user can determine when the search is complete and can obtain the desired search result without having to enter the entire text or word of the search term.

The features and advantages described in the specification are not all inclusive, and, in particular, many additional features and advantages will be apparent to one of ordinary skill in the art in view of the drawings, specification and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims and the accompanying figures (or drawings). A brief introduction of the figures is below.

Figure (FIG.) 1A illustrates an environment adapted to support multi-prefix, interactive searching on a mobile communications device in accordance with some embodiments.

FIG. 3A is a flowchart illustrating a process of client-server interaction during multi-prefix, interactive searching in accordance with some embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Architecture

Figure 1A:
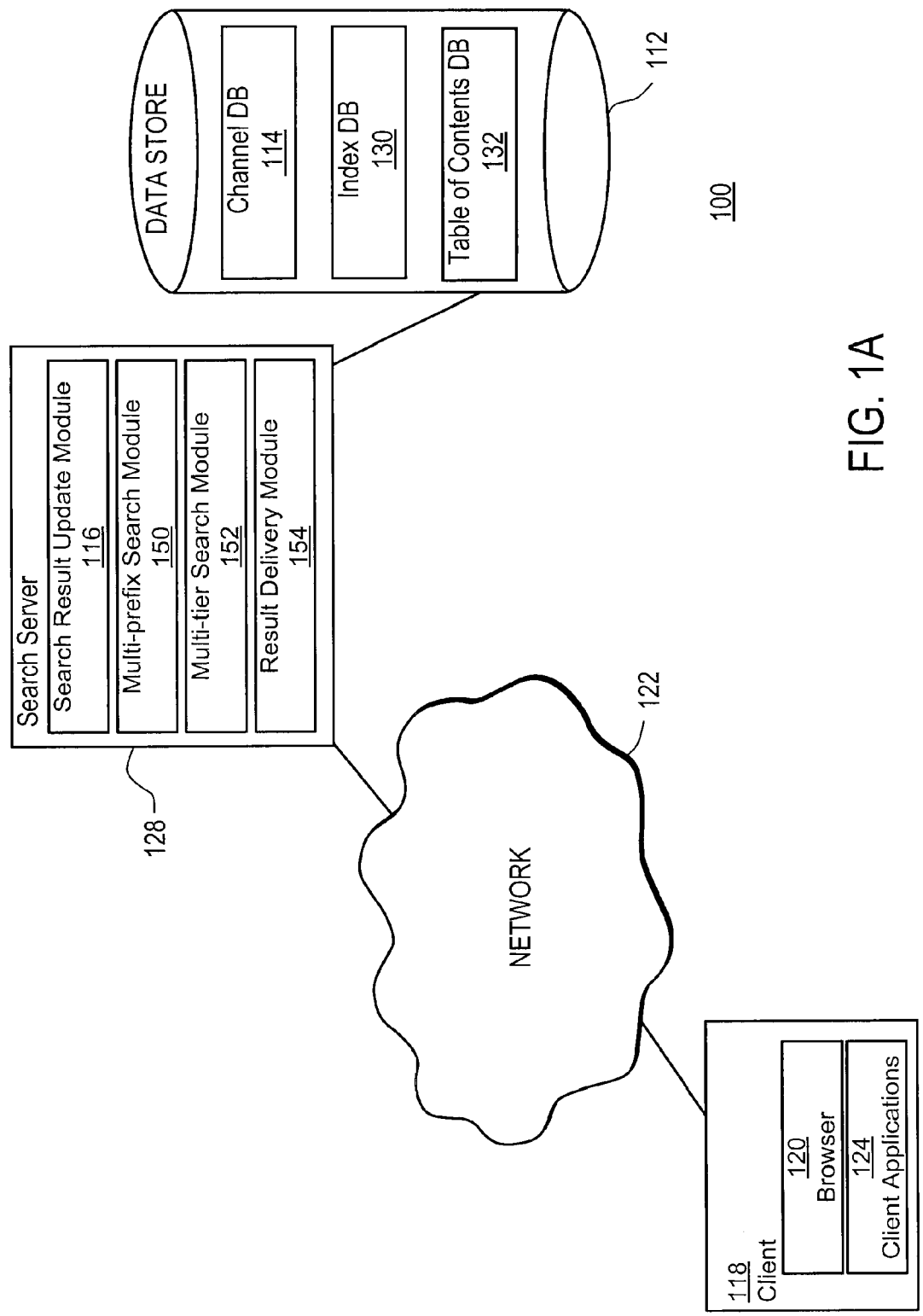
FIG. 1B is a high level block diagram illustrating the data structure contained within the channel database in accordance with some embodiments.

FIG. 1A is a block diagram illustrating an architecture for providing multi-prefix, interactive search capability on a mobile communications device. The network 122 enables communications between a client 118 and a search server 128 coupled to a data store 112. Thus, the network 122 can include links using technologies such as Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 122 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 122 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs) or Internet Protocol security (IPsec). In another embodiment, the entities can use custom and/or dedicated data communications technologies instead of, or in addition to, the ones described above. Depending upon the embodiment, the network 122 can also include links to other networks such as the Internet.

The client 118 executes a browser 120, comprises client applications 124 and can connect to the search server 128 via a network 122, which is typically the Internet, but may also be any network, including but not limited to a LAN, a MAN, a WAN, a mobile, wired or wireless network, a private network, or a virtual private network, and any combination thereof. While only a single client 118 is shown, it is understood that very large numbers (e.g., millions) of clients are supported and can be in communication with the search server 128 and search result update server 116 at any time. The client 118 may be a mobile communications device similar to the one described in FIG. 2.

The search server 128 includes a search result update module 116, a multi-prefix search module 150, a multi-tier search module 152, and a result delivery search module 154. The search server 128 facilitates multi-prefix, multi-tier, interactive searching by enabling a user to enter prefixes of words or text of a search query to obtain various tier levels of search results. The search server 128 also facilitates multi-prefix, interactive, result delivery searching by enabling a user to enter prefixes of words or text to obtain desired results without having to go through intermediary steps to get those results. The search server 128 also facilitates multi-prefix searching on a mobile communications device.

The search result update module 116 facilitates the update of the search results when a user inputs a keystroke, therefore allowing for interactive search capability. Multi-prefix search module 150 facilitates multi-prefix searching by providing the user the ability to enter the prefix of the words of an entire search term to obtain desired search results. The multi-tier search module 152 facilitates multi-tier searching by providing different tier level of results. The result delivery search module 154 facilitates result delivery by searching a plurality of data fields associated with a particular data set in order to produce desired results. Further description regarding usage of these modules is provided below.

The search server 128 is coupled to a data store 112. The data store 112 includes a channel database 114, an index database 130 and a table of contents database 132. A channel represents a content category, such as news, flight information, recipes, etc. The channel database 114 contains records. Each record contains a heading and one or more URLs. The record also contains an indication whether each URL references a channel. Then index database 130 contains lists of prefixes, and for each prefix, a list of record IDs that contain words with the prefix, as well as relevancy factors for use in ranking The table of contents database 132 contains prefix entries to aid traversing the index. The amount of entries contained in the table of contents database 132 effects the time spent traversing the index to find relevant record ID lists. Many entries in the table of contents slow down the search of the table of contents database 132, but reduces the time spent traversing the index to find relevant record ID lists. Fewer entries contained in the table of contents database 132 speed up the search of the table of contents, but increases the time spent traversing the index to find relevant record ID lists. Further description regarding usage of these modules is provided below.

Figure 1B:
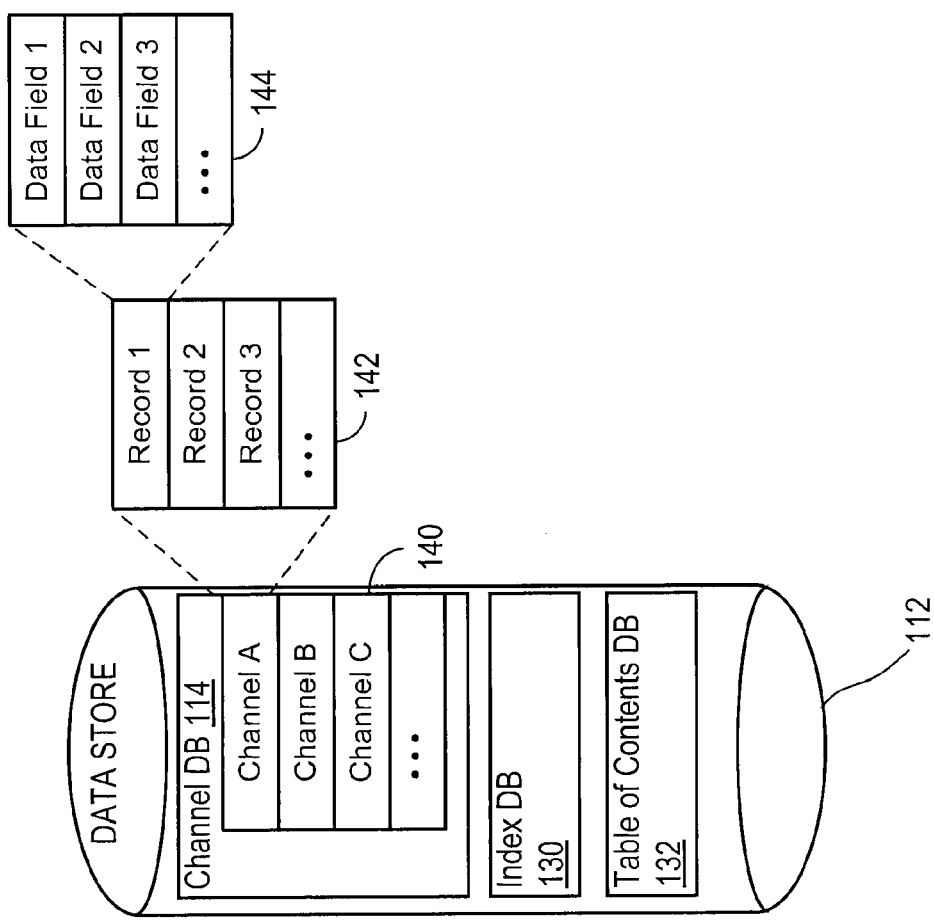

As illustrated in FIG. 1B, the channel database 114 includes channel data sets 140. Each channel data set 140 includes a list of records 142. Each record contains data fields 144. Each record is associated with a least one heading and a deep link (a hypertext link to a page or a web site other than its home page). In some embodiments, each record contains a heading and a parameter that can be inserted into a URL template to create a deep link. A heading may be the displayed title associated with a particular record. For example, in a list of Wikipedia articles, an example of a heading may be "John Fitzgerald Kennedy," "High School Musical," or "World Wide Web." An other example, in a list of people in a directory, a heading may include the name of the person, his or her telephone, and his or her address.

Each data field 144 contains identifying information related to that particular channel. A data field 144 may also contain other information related to that particular channel. For example, if the channel is the AMAZON™ Books channel, the data fields 144 may contain items such as a title, an author, an International Standard Book Number (ISBN) and a price. As another example, in a Whitepages channel, the data fields 144 may contain a name, an address, a home phone number and a mobile phone number. In some embodiments, one data field 144 contains multiple items. In other embodiments, each data field 144 contains separate items.

In some embodiments, a data field 144 may be associated with additional items that represent terms that are equivalent to the original items contained in the data field. For example, in a name data field containing "Robert," that data field may be associated with terms such as "Bob," "Bobby" or "Rob" (i.e. terms that are equivalent to the term "Robert").

Those skilled in the art will recognize that the search server 128 is implemented as server program executed on a desktop computer, laptop computer, or server-class computer comprising a CPU, memory, network interface, peripheral interfaces and other well known components. The computers themselves preferably run an open-source operating system such as LINUX, have generally high performance CPUs, 1G or more of memory, and 100G or more of disk storage. Of course, other types of computers can be used, and it is expected that as more powerful computers are developed in the future, they can be configured in accordance with the teachings here. The functionality implemented by any of the elements can be provided from computer program products that are stored in tangible computer accessible storage mediums (e.g., RAM, hard disk, or optical/magnetic media).

For purposes of illustration, FIG. 1A shows the search result update module 116, the multi-prefix search module 150, the multi-tier search module 152, the result delivery search module 154, the channel database 114, the index database 130 and the table of contents database 132 as discrete modules. However, in various embodiments, any or all of the result update module 116, the multi-prefix search module 150, the multi-tier search module 152, the result delivery search module 154, the channel database 114, the index database 130, and the table of contents database 142 can be combined for operation one single computing device having storage. This allows a single module to perform the functions of one or more of the above-described modules. Further, the search server 128 and the data store 112 are shown as discrete components for purposes of illustration. In other embodiments, the search server 128 and the data store 112 can also be combined for operation on a single computing device having storage.

Figure 2:
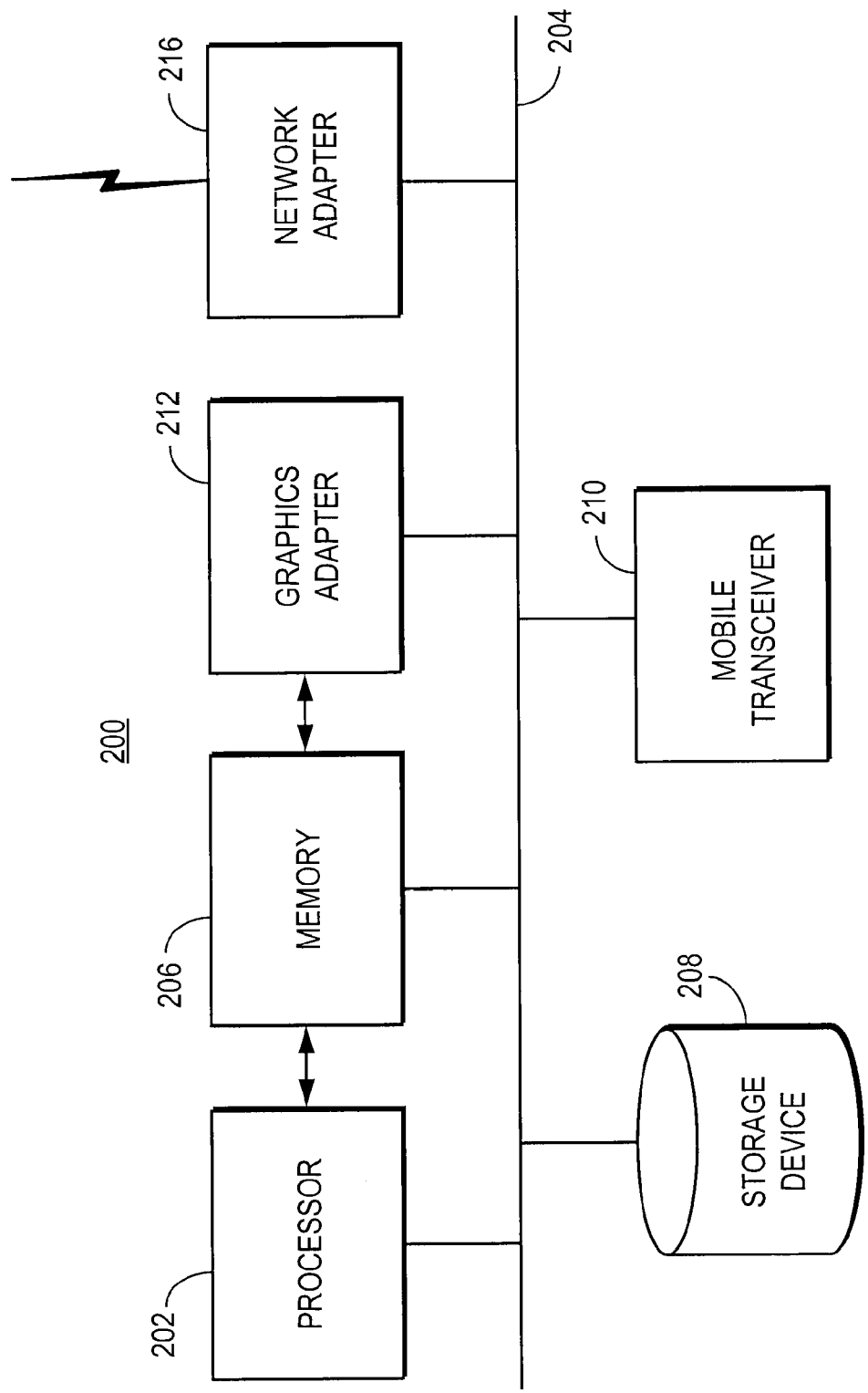
FIG. 2 is a high level block diagram illustrating a functional view of a typical mobile communications device in accordance with some embodiments.

FIG. 2 is a high level block diagram illustrating a functional view of a typical mobile communications device 200 in accordance with some embodiments. Illustrated are at least one processor 202 coupled to a bus 204. Also coupled to the bus 204 are a memory 206, a storage device 208, a graphics adapter 212, a network adapter, and a mobile transceiver 210 including a display, keyboard, and optionally, a pointing device (not shown). In some embodiments, the display is a touch screen display. In one embodiment, the functionality of the bus 204 is provided by an interconnecting chipset.

The storage device 208 us any device capable of holding data, such as a memory stick, a secure digital (SD) card, a solid-state memory device or a hard drive. The memory 206 holds instructions and data used by the processor 202. The optional pointing device (not shown) is used in combination with the keyboard (also not shown) to input data into the mobile communications device 200. The graphics adapter 212 displays images and other information on the display on the mobile communications device 200. The network adapter 216 couples the mobile communications device 200 to a local or wide area network.

As is known in the art, a mobile communications device 200 can have different additional components other than those shown in FIG. 2. Furthermore, the mobile communications device 200 can lack certain illustrated components or include certain components not shown.

As is known in the art, the mobile communications device 200 is adapted to execute computer program modules for providing functionality described herein. As used herein, the term "module" refers to computer program logic utilized to provide the specified functionality. Thus, a module can be implemented in hardware, firmware and/or software. In one embodiment, program modules are stored on the storage device 208, loaded into the memory 206 and executed by the processor 202. The modules may be loaded as part of the client application 124.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

System Operation

Figure 9A:
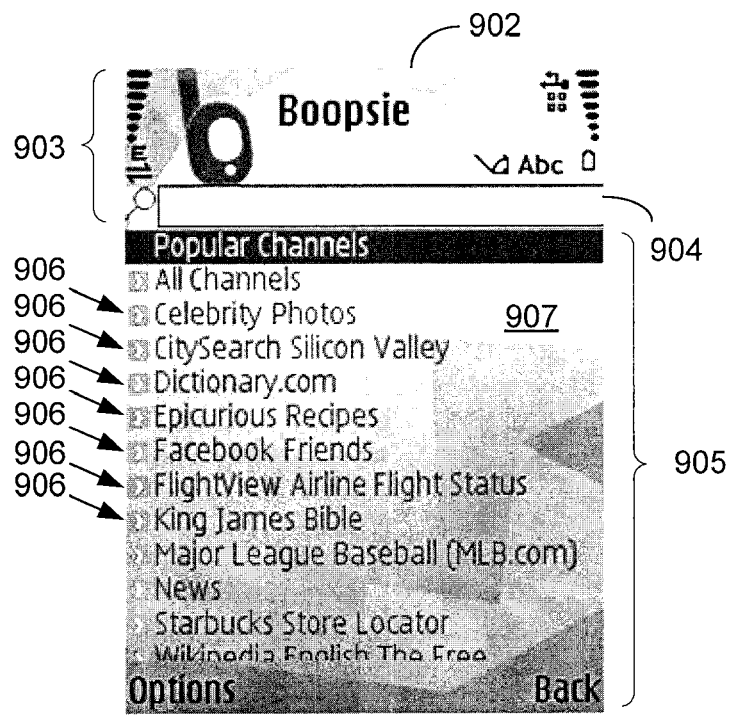
FIGS. 9A-9M illustrate graphical representations of screenshots of a display of a mobile communications device in accordance with some embodiments.
Figure 9B:
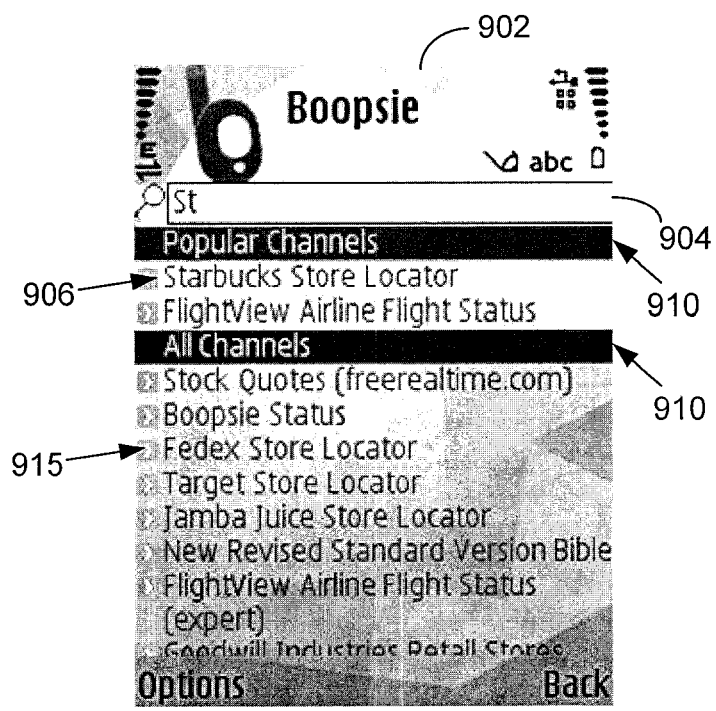

FIG. 3A is a flowchart illustrating a process 300 of client-server interaction during multi-prefix, multi-tier, interactive searching in accordance with some embodiments. An application for multi-prefix, multi-tier, interactive searching is initialized 301 by a mobile communications device. The server sends 302 an initial information to display in a window of the mobile communications device. The window is displayed 303 on a display of the client device. In one embodiment, the window appears like the window 902 as illustrated in FIG. 9A. The window 902 includes a search area 903, which includes a search query field 904, and a display area 905. The display area 905 includes a landing page 901, which contains headings 906 for associated channels for user selection. Each heading 906 refers to either another channel (list of headings) or to a URL, which is a deep link into a web site. The headings 906 are links to categorized information, such as news, celebrity photos or flight status. The headings 906 may also be links to various websites, such as gmail.com and fandango.com. A keystroke associated with an alphanumeric character is input 304 on the mobile communications device in the search query field 904 as shown in FIG. 9A, and sent 304 to the server. The user input is received 306, a search 307 of the channel database 114 is performed using the input, and sent 308 to the client. The display area 905 is updated accordingly. The display area 905 displays 309 a first tier of search results, which include channels associated with the user input. As shown in FIG. 9B, a user inputs "St" in the search query field 904, and the display area is refreshed to display results corresponding to the "St" search query. In this example, "St" corresponds to search results "STARBUCKS™ Store Locator," "FlightView Airline Flight Status," "Stock Quotes," etc. In one embodiment, the displayed result, such as shown in FIG. 9B, may also include other organizational information such as the labels 910 ("Popular Channels" or "All Channels") to provide the user with additional information such that the headings are intuitively recognized and understood by the user. The displayed results may also include selectable links 915 to channels or websites as shown in FIG. 9B.

Figure 9C:
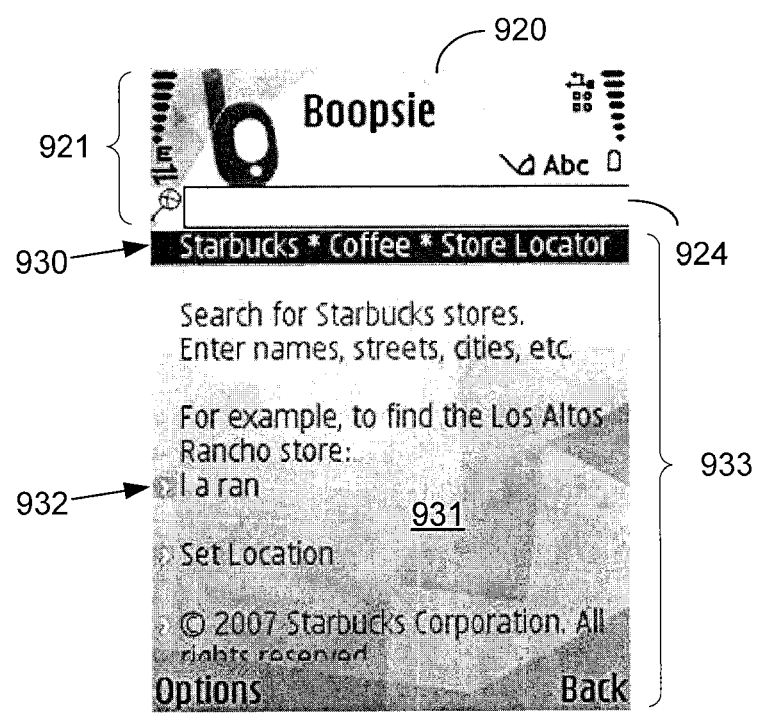

If the desired result is displayed (310-Yes), a result may be selected 312. The result selection is received 314 and the corresponding channel or web page is sent 315 to the client. The channel or web page is then displayed 316 on the display of the mobile communications device. The selection directs the user to the channel or website corresponding to the selected result where the user can input 318 a search query in the channel or web page or simply explore 318 the displayed page. In some embodiments, if the result selected is a web page, a separate web browser is launched to display the web page. As shown in FIG. 9C, the user has selected the STARBUCKS™ Store Locator channel 906 (FIG. 9B). This selection directs the user to the STARBUCKS™ Coffee Store Locator channel as shown in FIG. 9C.

If the desired result is not displayed (310-No) within the search results, another keystroke may be inputted 304. Again, the user input is received 306, the channel database 114 is searched 307, results are sent 308, and the display area is refreshed accordingly by displaying 309 the search results.

Additional keystrokes may be entered until the desired channel is displayed. With each keystroke, the results list is updated by the search result update module 116.

In some other embodiments, users may input space character keystrokes as well as alphabetic or numeric character keystrokes. As shown in FIGS. 9E and 9F, a user has selected the Starbucks Coffee Locator channel and has entered a search query in the search query field 904 that includes a prefix delimiter, such as a space character. The user's search entry in the search query field 904 represents the prefixes for each word of a multi-prefix search query. The user has entered a first prefix (first letter or first several letters of a word or text), separated by a space character, and a second prefix and is provided with a list of search results corresponding to the user input by the multi-prefix search module 150. This allows users to input fewer keystrokes to obtain the desired search results. In other embodiments, a wild card character or a symbol can be used in place of spaces between multiple prefixes of a search.

The method described above provides for a multi-prefix, interactive search capability. The search is multi-prefix because if the search term contains multiple words, the user enters the prefix of one or more words of the multi-term search query, therefore, providing the capability for users to enter less keystrokes and obtain a desired search result. The search is interactive because a user is provided feedback (displayed search results) with each keystroke. Based on partial query results, a user can determine when the search is complete and can obtain the desired search result without having to enter the entire search term. Therefore, fewer keystrokes are needed as compared to searching using the current technologies available.

Figure 3B:
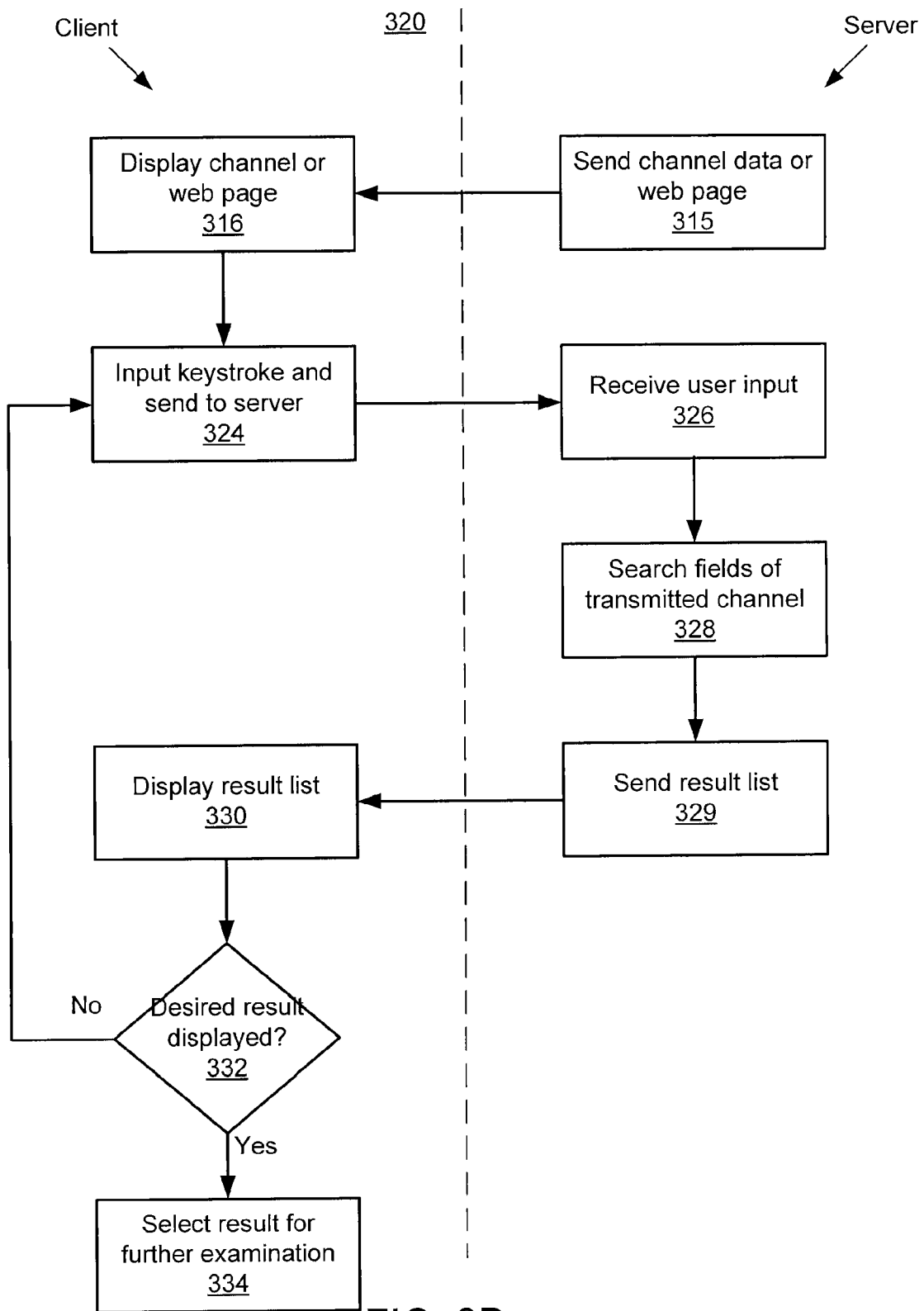
FIG. 3B is a flowchart illustrating a process of client-server interaction during multi-prefix, interactive searching in accordance with some other embodiments.

FIG. 3B is a flowchart illustrating a process 320 of client-server interaction during multi-prefix, interactive searching in accordance with another embodiment. A channel or web page is sent 315 to the client. The window, including a search area and a display area, of the channel or web page is then displayed 316 on the display of the mobile communications device. In one embodiment, the window may look like the window 920 as illustrated in FIG. 9C or 9I. The search area 921 includes a search query field 924. A user inputs 324 keystrokes in the search query field 924. The server receives 326 the user input and searches 328 the data fields of the records in the channel for search results that match the search query. For example, if the White Pages channel was being searched, the server would receive the search query and search the name, address, and telephone number fields of the records to determine if there was a match for the received search query. The result list is then sent 329 to the mobile communications device.

Figure 9D:
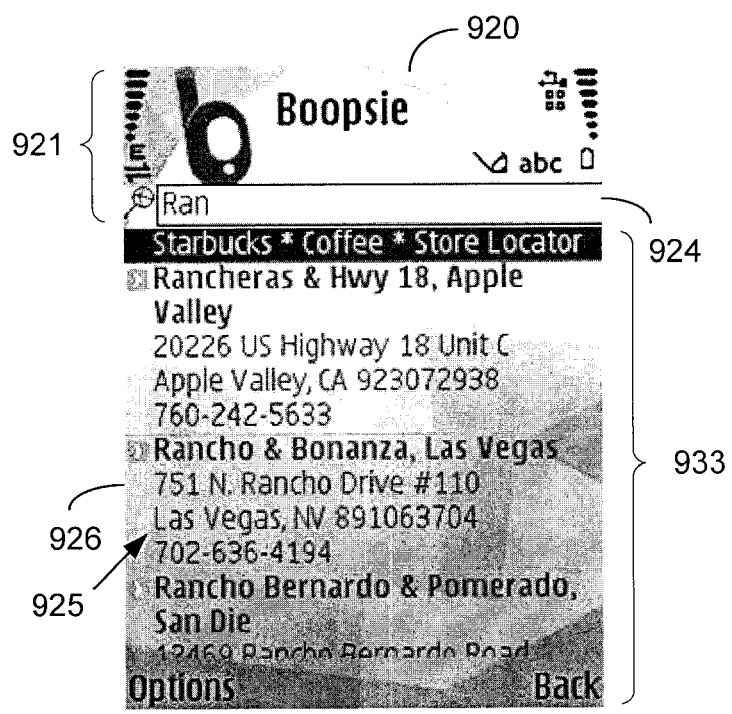
Figure 9E:
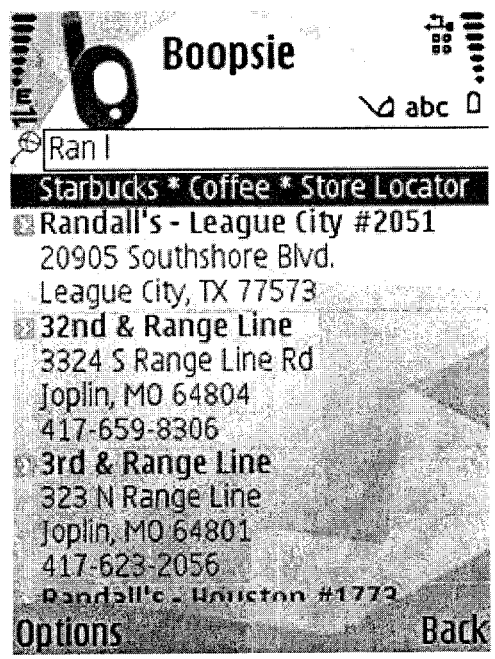
Figure 9F:
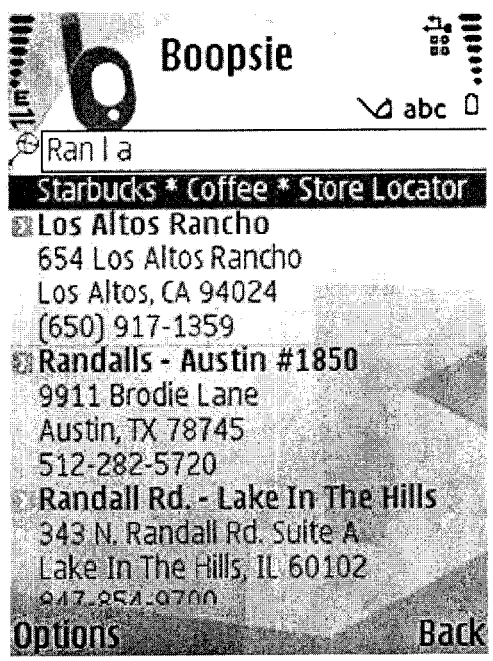
Figure 9G:
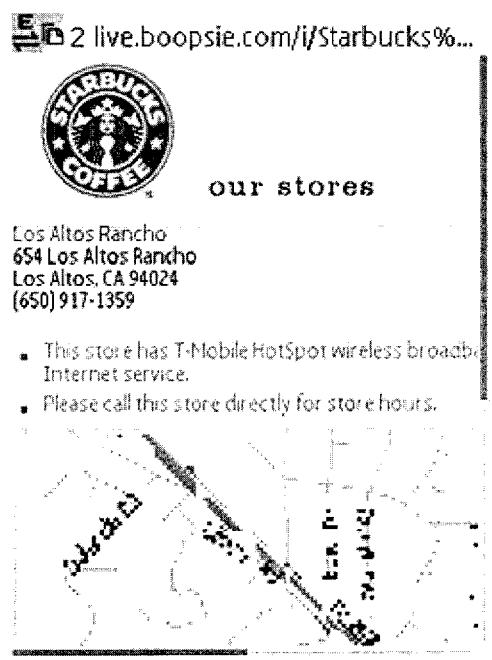

Search results 926 that match the search query are displayed 330 in the display area 933 as shown in FIG. 9D. In some embodiments, as shown in FIG. 9D, additional information 925 associated with the search result is displayed in the display area 933 along with the search result 926. If the desired result in the list of results 926 is displayed (332-Yes), then the desired result may be selected 334 and additional information about the result may be displayed. However, if the desired result is not displayed in the list of results (332-No), another keystroke may be inputted 324 to receive and display different search results. Space character keystrokes may also be inputted to indicate that the search query has multiple terms.

When the server 128 searches for a search result that matches the search query, the server searches the various data fields and records within a channel data set. In one embodiment, the search is performed on structured data, such as the data set described in the channel database 114. In other embodiments, the search is performed on unstructured data, which includes data and links without categorized fields.

Figure 9H:
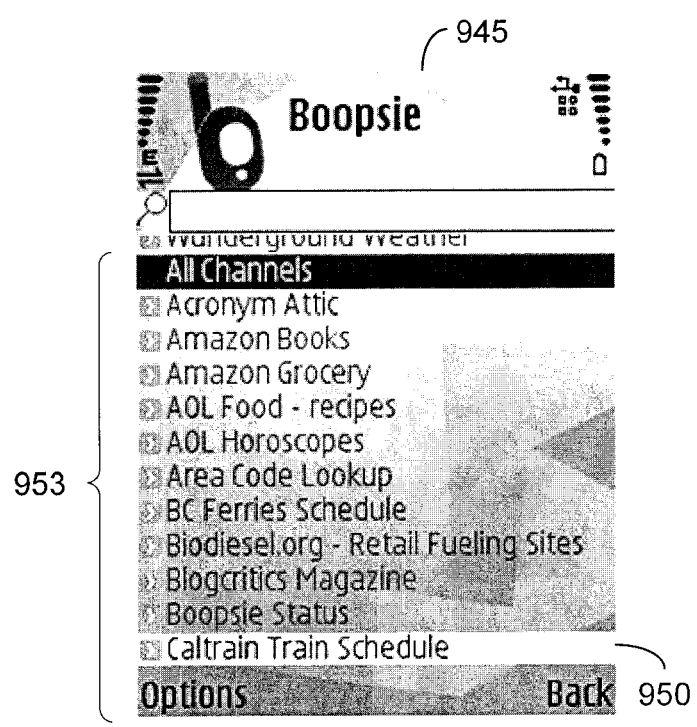
Figure 9I:
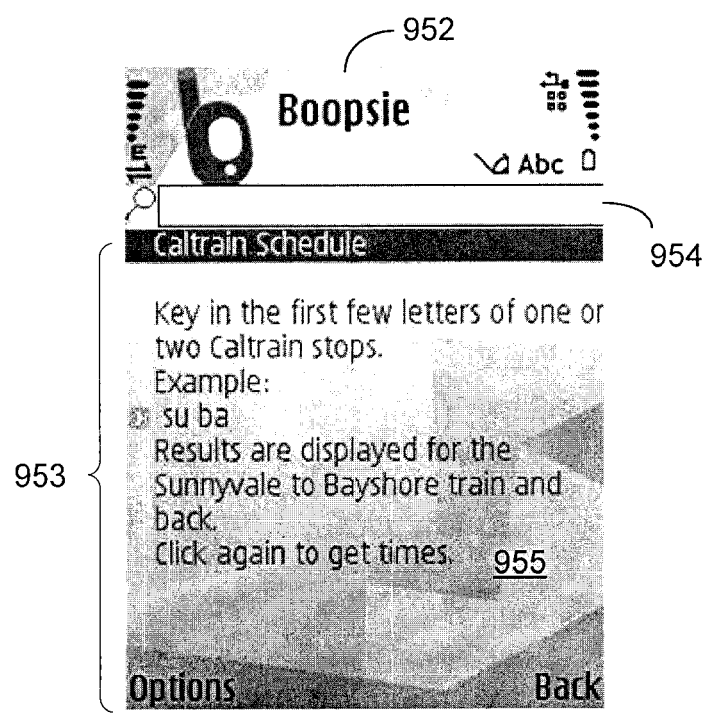
Figure 9J:
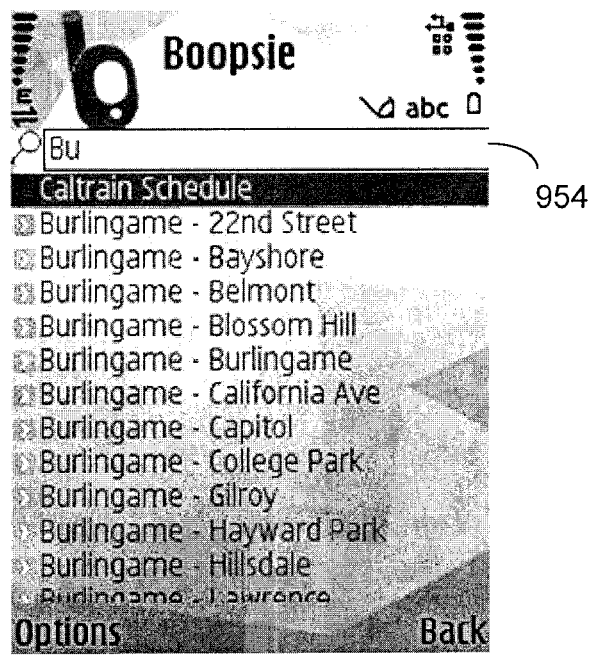
Figure 9K:
Figure 9L:
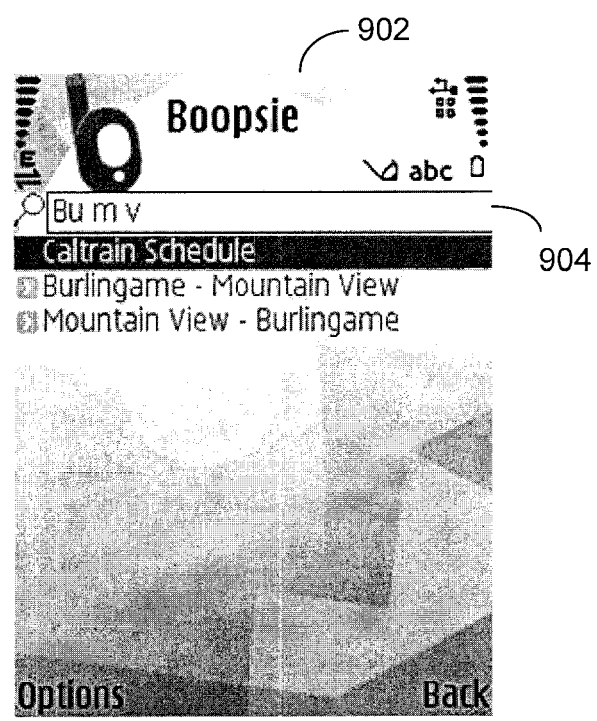
Figure 9M:

FIGS. 9C-9G provide an illustration of the method. In FIG. 9C, the window 920 for the STARBUCKS™ Coffee Locator includes a search area 921 and display area 933. The search area 921 includes a search query field 924. The display area 933 in FIG. 9C shows an initial landing page 931. In some embodiments, the landing page 931 may also include selectable links 932 to additional information. Keystrokes, which include alphanumeric characters, are entered into the search query field 924 as seen in FIG. 9D. Search results 926 are displayed in the display area 933 as shown in FIG. 9D. Additional keystrokes are entered into the search query field 924 (FIGS. 9E and 9F) to input a second prefix, and the search results list 926 is refreshed with search results that match the updated search query having two prefixes. In the illustrations provided in FIGS. 9E and 9F, the prefix of a word is entered into the search query field 924, followed by a space character and the prefix of another word of the search term. A prefix is the first letter or first few letters of a word of the search term. When the desired result is displayed, a result is selected and the display area 933 is updated to display additional information regarding the search query. In this example, the records and data fields of the STARBUCKS™ Coffee Locator channel have been searched to determine the matching search results. In this case, the data fields contain information related to location and telephone contact of the STARBUCKS™ stores that match the search query. Those skilled in the art will understand how the present invention is advantageous because simply by entering the keystrokes and selecting a single channel, the mobile communications device displays the exact web page or channel the user is seeking FIGS. 9H-9M also provide an illustration of the above. The Caltrain Train Schedule channel (950 in FIG. 9H) has been selected to display the associated landing page 955 (FIG. 9I) in the display area 953 of the window 952 of the channel. Characters of a search query are entered in to the search query field 954. When the desired result is displayed, such as in FIG. 9I, the result heading may be selected and additional information may be received. In this example, the Burlingame—Mountain View schedule is selected and the schedule page 960 is displayed as shown in FIG. 9M.

Figure 10A:
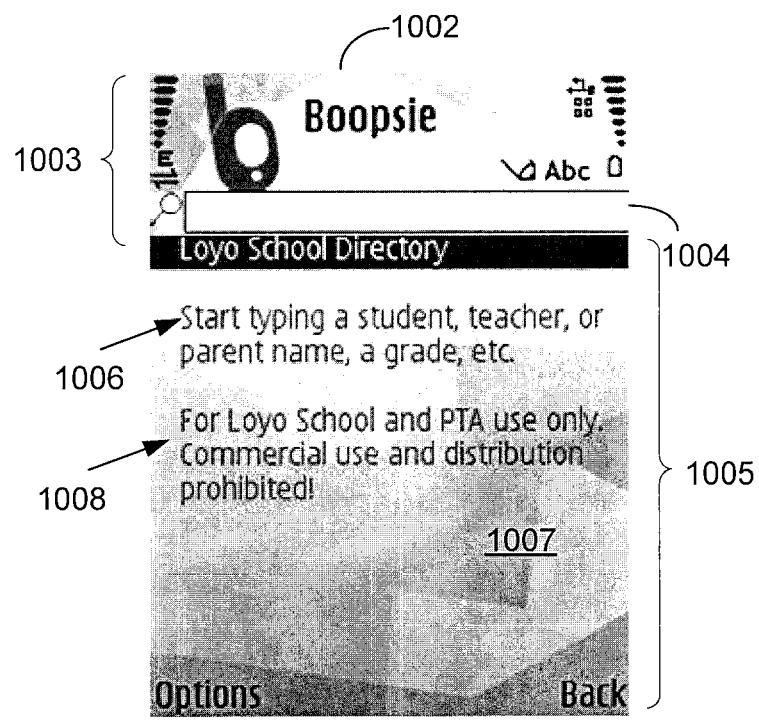
FIGS. 10A-10C illustrate graphical representations of screenshots of a display of a mobile communications device in accordance with another embodiment.
Figure 10B:
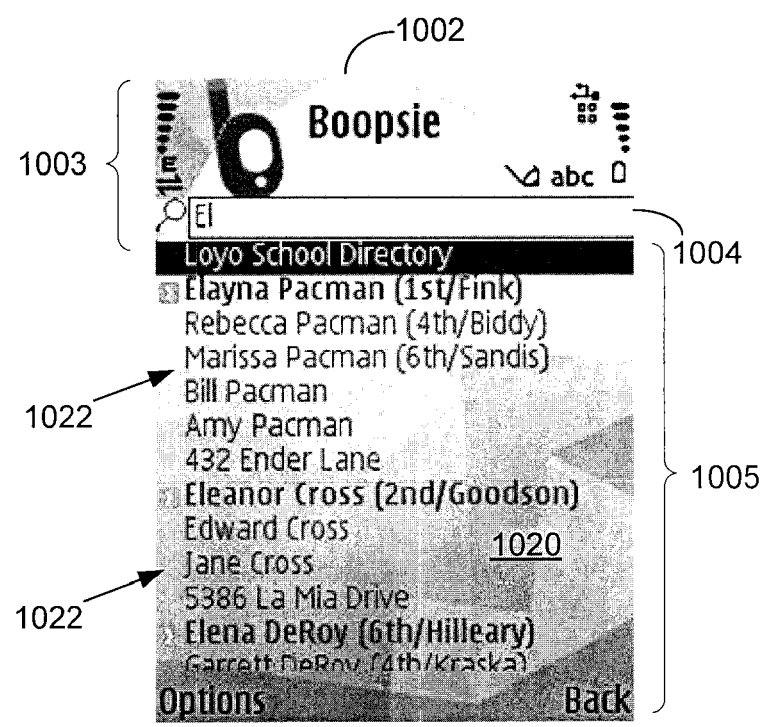
Figure 10C:
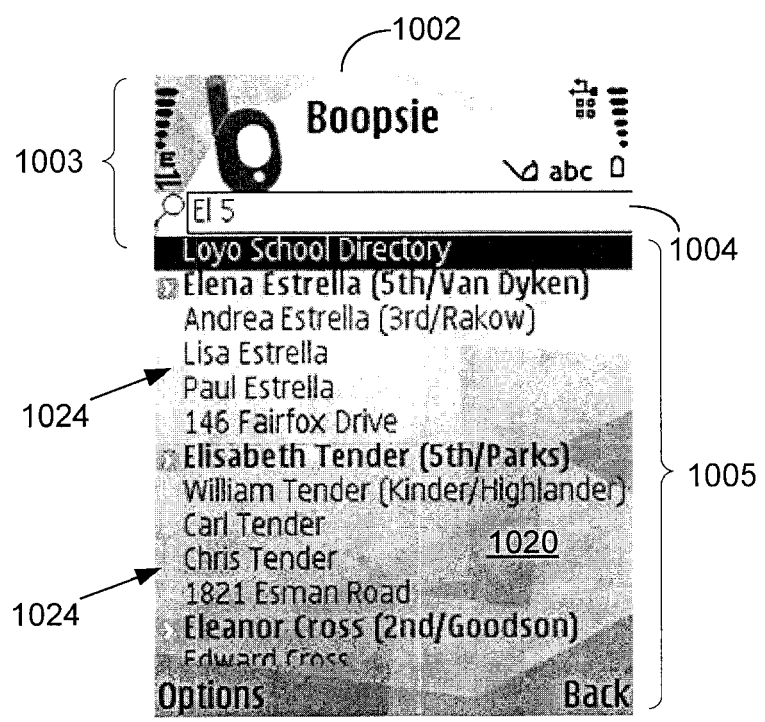

Another illustrative example of the flow chart in FIG. 3B may be seen in FIGS. 10A-10C. FIG. 10A shows a window 1002 displaying the Loyo School Directory channel. The window 1002 includes a search area 1003 and a display area 1005. The search area 1003 includes a search query field 1004. The display area 1005 of FIG. 10A includes a landing pate 1007 contains instructions 1006 and other information 1008. In some embodiments, the landing page 1007 may also include links to additional information (not shown). In this example, a prefix is entered into the search query field 1004 and display area 1005 is refreshed to show results 1022 as shown in FIG. 10B. The search results 1022 include information associated with a record. The information represents the items contained in the data fields associated with the record. In this example, the additional information 1014 includes name of parent(s), name(s) of siblings, grade and name of teacher, and address, which is associated with the record "Elayna Pacman." As shown in FIG. 10C, when an additional prefix is entered into the search query field 1004, the display area 1005 is refreshed with new results 1024. In this example, the prefixes ("El 5") are found across multiple data fields, therefore displaying results matching a name that includes "El" and a grade that includes "5." In some embodiments, the result 1022 or 1024 may be selected to display additional results.

Figure 3C:
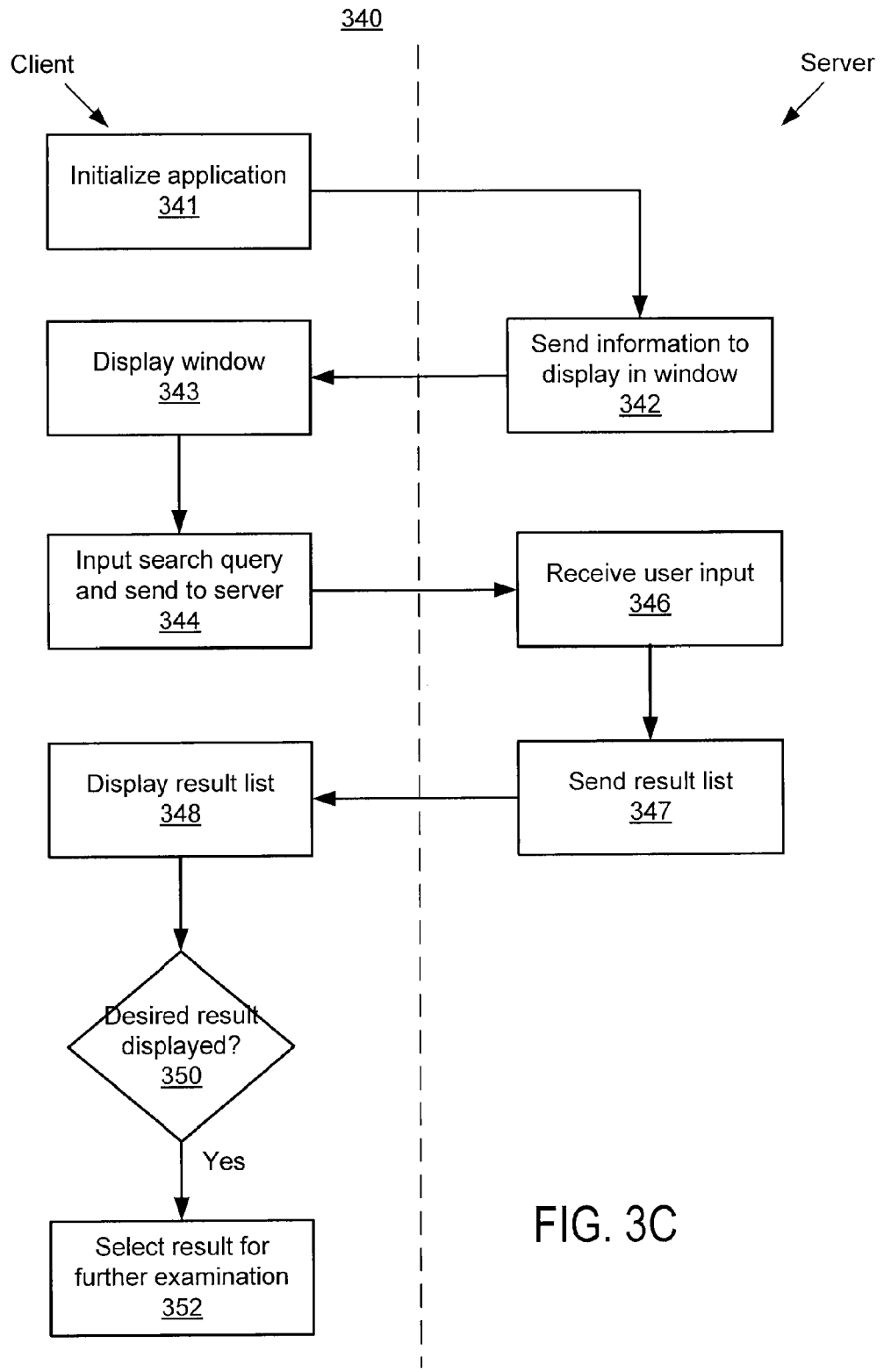
FIG. 3C is a flowchart illustrating a process of client-server interaction during multi-prefix, interactive searching in accordance with some other embodiments.

FIG. 3C is a flowchart illustrating a process 340 of client-server interaction during multi-prefix searching on a mobile communications device in accordance with some embodiments. An application for multi-prefix searching is initialized 341 and information is sent 342 to be displayed in a window of the mobile communications device. A window is displayed 343 on a display of a mobile communications device. A search query is input 344 into a search query field, and a confirmation is made to indicate that the search query string is complete and the search query is sent 344 to the server. The search query is a multi-term search query and contains the prefix of at least one of the terms of the entire search query. The search query is received 346 by the server, which sends 347 a result list to be displayed 348 on the mobile communications device. If the desired result is displayed (350-Yes), the result may be selected 352 and additional information may be displayed. If the desired result is not displayed (350-No) the process is started again when another search query is input and sent to the server.

Figure 4:
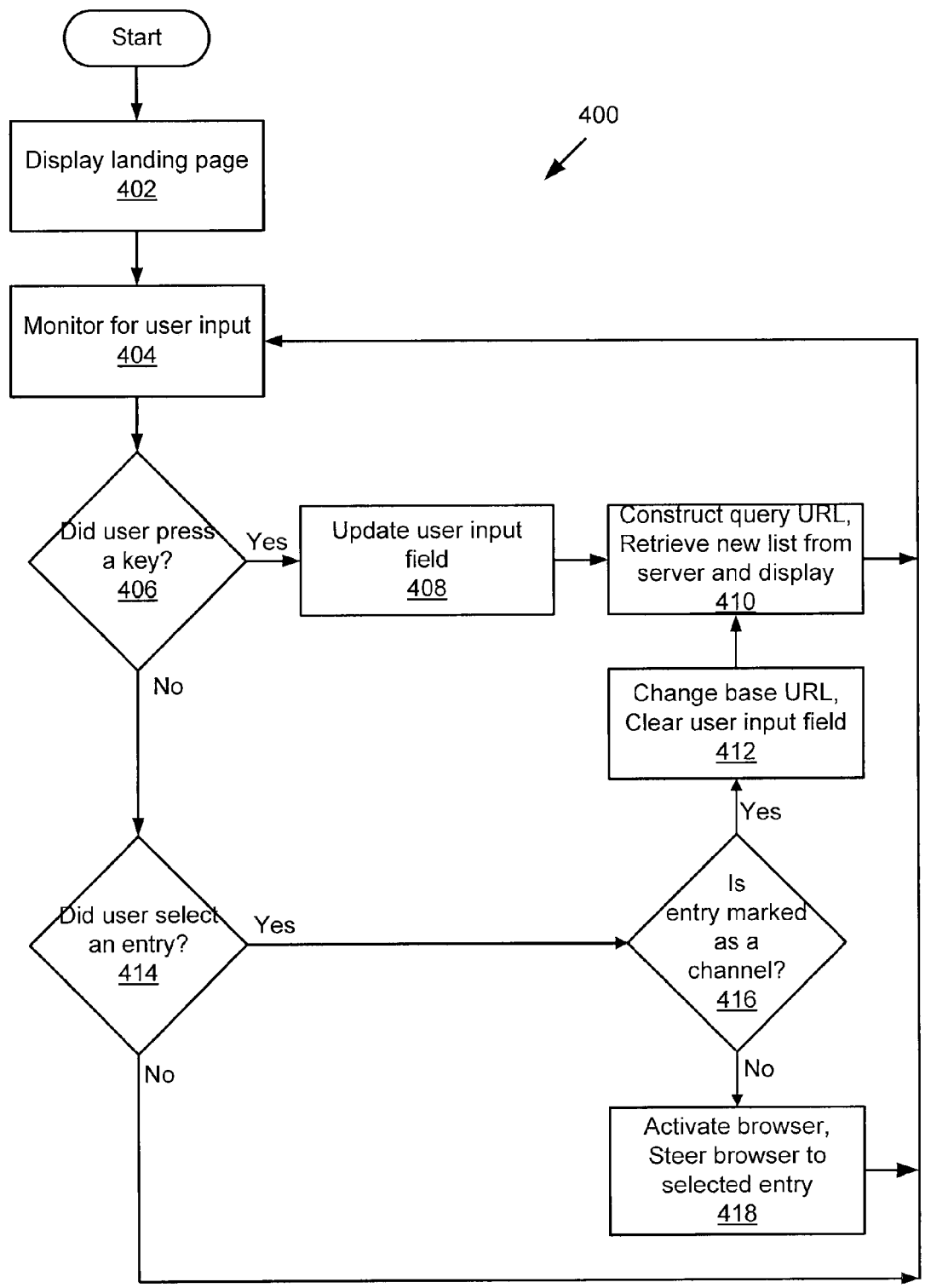
FIG. 4 is a flowchart illustrating a process for interactive searching in accordance with some embodiments.

FIG. 4 is a flowchart illustrating a process 400 for interactive searching in accordance with some embodiments. The mobile communications device displays 402 a window (902, FIG. 9A), which contains instructions. In some embodiments, the display of the mobile communications device initially displays a first tier of channels, which is obtained by submitting a base channel uniform resource location (URL) with no search terms. The system monitors 404 for the user input. The user then performs a sequence of actions. The user can key characters into the input area (as shown in FIG. 9B), or the user can select an item from the list of headings displayed on the window. If the user inputs a key character, or keystroke, into the input area (406-Yes), the user input field is updated 408. A query URL is constructed 410 and submitted by combining the base URL with the characters that the user has inputted in the search query field. The resulting records from the URL are retrieved and the headings containing those results records is displayed in the output area. The system continues to wait 404 for another user input. The aforementioned steps are repeated until the user selects an entry.

If the user did not input a key character, or keystroke (406-No), a determination 414 is made as to whether an entry is selected. If the user selects an entry (414-Yes), a determination 416 is made to determine whether the entry is marked as a channel. If the entry is marked as a channel (416-Yes), the base URL is updated 412 to the URL in the selected record and the search query field is cleared 412. If the entry is not marked as a channel (416-No), the web browser is activated and the browser is directed 418 to the URL in the selected record.

Figure 5:
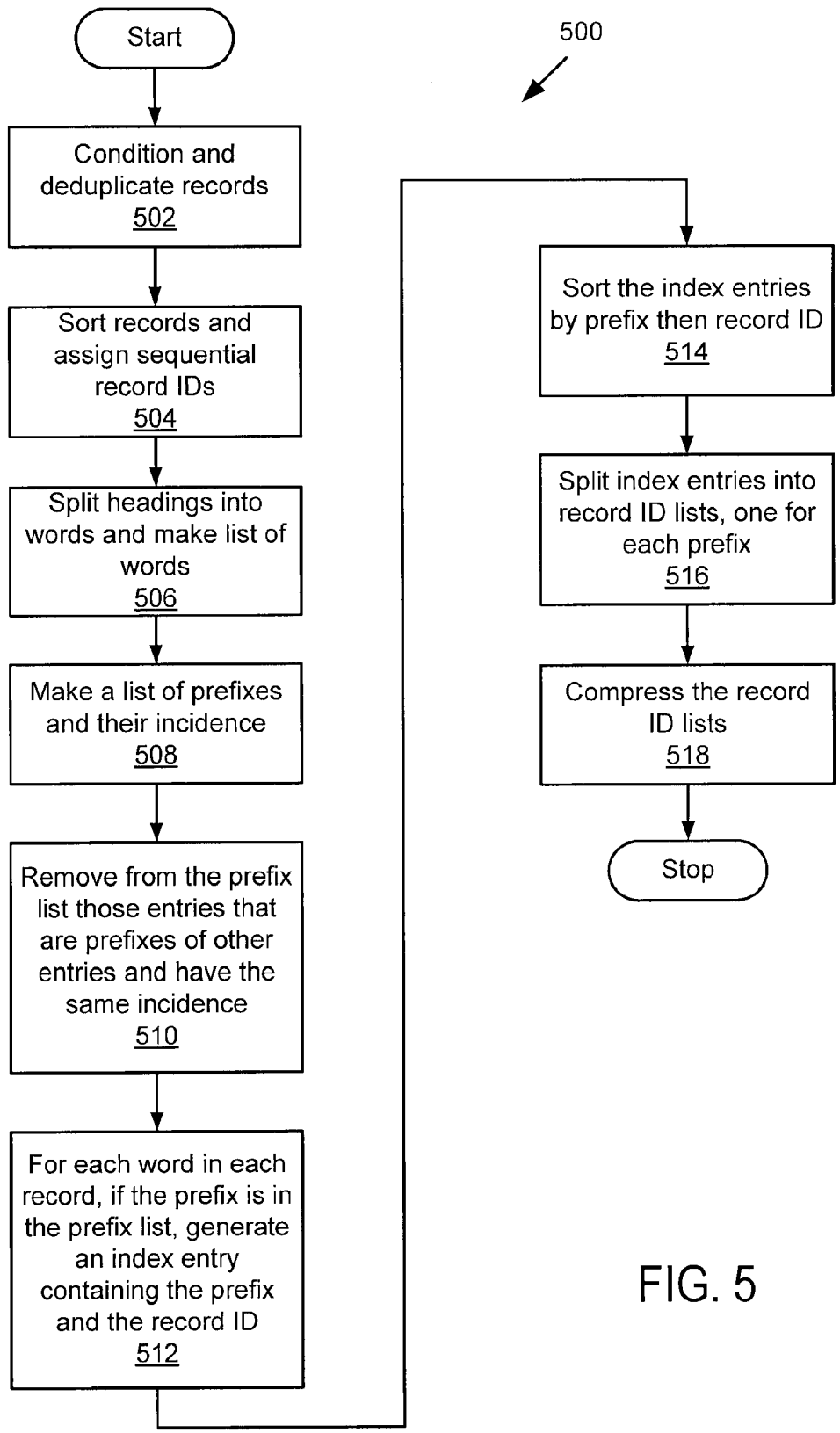
FIG. 5 is a flowchart illustrating a process for creating a multi-term prefix index in accordance with some embodiments.

FIG. 5 is a flowchart illustrating a process 500 for creating a multi-term prefix index in accordance with some embodiments. Each record of the database contains a heading and one or more URLs. The record also contains an indication whether each URL references a channel. The headings in each record are conditioned 502, which includes removing extra space characters from the beginning and end of the headings. Records with duplicate headings are removed 502. The records are sorted and assigned 504 sequential IDs. In some embodiments, the record IDs can be used as the relevancy factors when ranking the results, thereby causing the results to be displayed in sorted heading order without having to sort the headings themselves. The headings are split into words and a list of words is constructed 506. Utilizing the list of words, a list of word prefixes is created and the number of incidences is counted 508. An optimization of the list is performed. Prefixes that do not help to disambiguate between headings are not needed in the index. For example, given the headings "rat," "sat," "saw" and "say," the prefix "sa" disambiguates as well as the prefix "s," so "s" does not need to be included in the index. Entries that are prefixes of other prefixes and have the same incidence are removed 510 from the list of word prefixes. From the example above, "s" is a prefix of "sa" and both occur three times; therefore, "s" does not need to be included in the index.

Index entries are created 512 for each prefix in each word in each heading of the record if the prefix is in the list of disambiguating prefixes. Each entry contains the prefix and the record ID, as well as the position that the word occurred in the heading, which is used as a relevancy factor in ranking The entries are sorted 514 in alphabetical order by prefix. The list of index entries is split 516 into lists—one list for each prefix. The list of record IDs is compressed 518.

Figure 6:
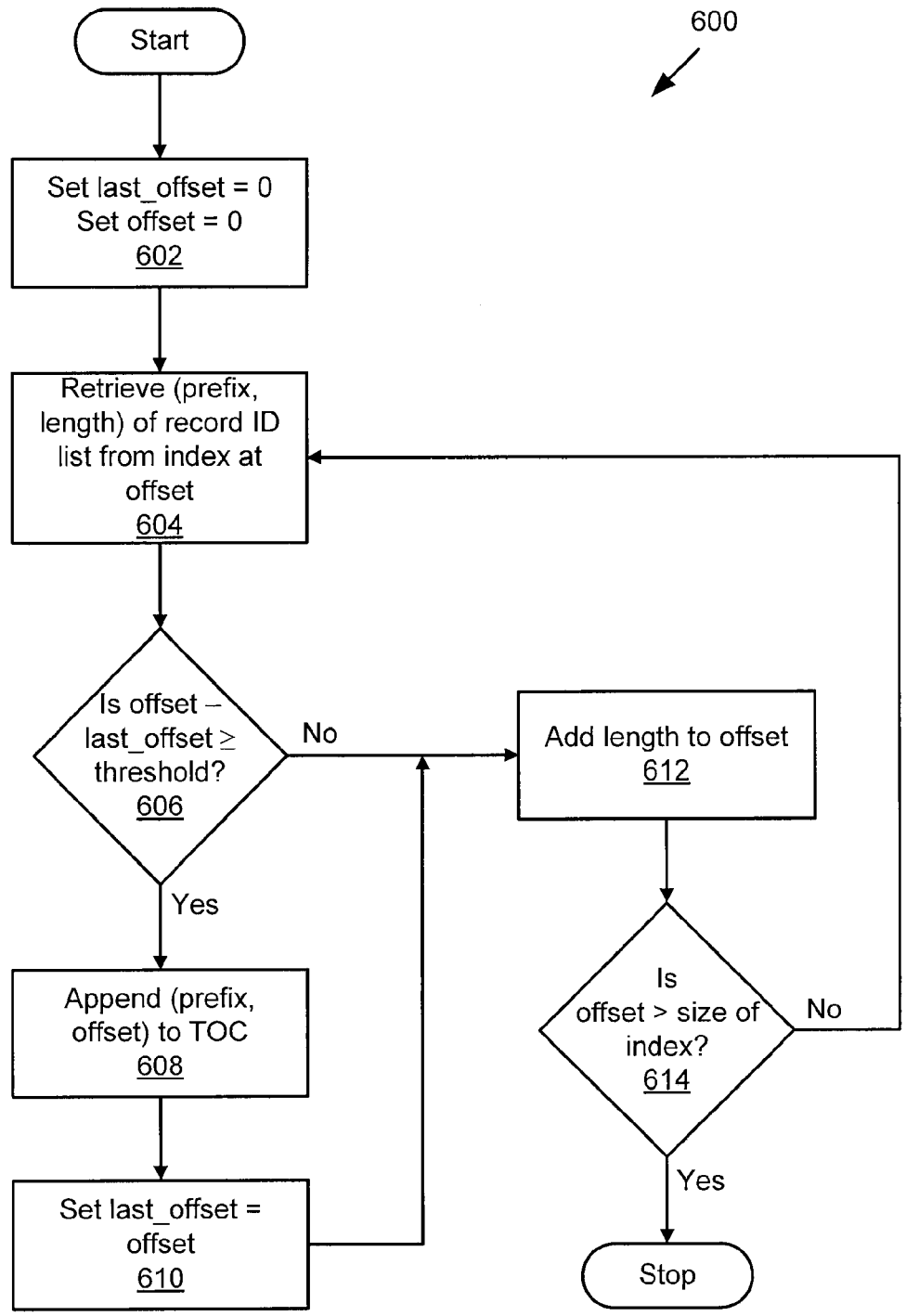
FIG. 6 is a flowchart illustrating a process for creating a table of contents in accordance with some embodiments.

FIG. 6 is a flowchart illustrating a process 600 for creating a table of contents in accordance with some embodiments. The table of contents is created based on a threshold. Smaller threshold values cause the table of contents to contain more entries, which slows the search of the table of contents, but reduces the time spent traversing the index to find relevant record ID lists. Larger threshold values cause the table of contents to contain fewer entries, which speeds the search of the table of contents, but increases the time spent traversing the index to find relevant record ID lists. With this trade-off in mind, the threshold value is user-definable and can be adjusted to maximize prefix search performance on a particular hardware system and user preferences.

Process 600 begins and two offsets are initialized 602 at the start of the index. The record ID list that begins at the offset is retrieved 604 from the index. The prefix and length are retrieved from the record ID list. The difference between the offset and the last offset is determined 606. If the difference between the offset and the last offset is smaller than the predetermined threshold (606-No), the length is added 612 to the offset. A determination 614 is then made as to whether the offset is greater than the size of the index. If the offset is greater than the size of the index (614-Yes), then the creation of the table of contents is complete. If the offset is not greater than the size of the index, the record ID list that begins at the offset is retrieved 604 from the index.

If the difference between the offset and the last offset is at least as large as the threshold (greater or equal to the threshold) (606-Yes), then the prefix and offset are appended 608 to the table of contents. The last offset is then set 610 to the offset and the length is added 612 to the offset.

Figure 7:
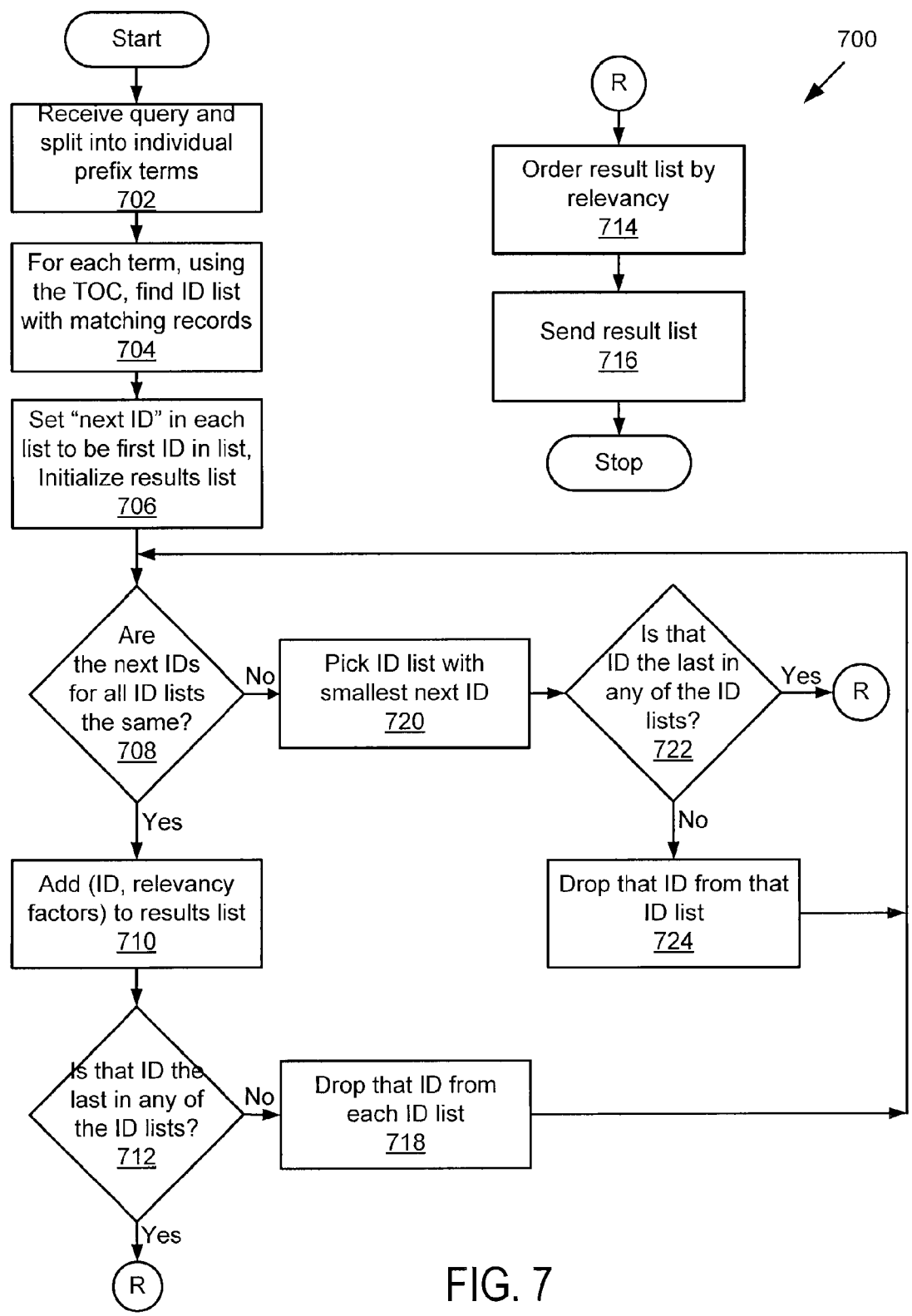
FIG. 7 is a flowchart illustrating a process for sending interactive search results in accordance with some embodiments.

FIG. 7 is a flowchart illustrating a process 400 for sending interactive search results in accordance with some embodiments. When a query is received, it is split 702 into individual prefix terms. For each prefix, the record ID list corresponding to the particular prefix is retrieved 704 (a detailed description of the process of this step is outlined in the description for FIG. 8 below). A "next ID" for each list is set to be the first ID in each list and a results list that holds certain information regarding each match is initialized 706. A determination 708 is made as to whether the next IDs are the same for all ID lists. If they are the same (708-Yes), the ID and relevancy factors are added 710 to the result list, which contains a list of all record IDs that occurred in each of the prefix lists, and, therefore, match the query. If that ID is the last ID in any of the ID lists (712-Yes), then the results are ordered 714 by relevancy and the result list sent 716 for display.

If the ID is not the last ID on the list (712-No), the current ID is dropped 718 from each list. Again, a determination 708 is made as to whether the next IDs are the same for all ID lists. If the next IDs are not the same (708-No), the list with the smallest next ID is selected 720. If that ID is the last ID in any of the ID lists (722-Yes), the result list is ordered 714 by relevancy and sent 716 for display. If that ID is not the last ID in any of the ID lists (722-No), that ID is dropped 724 from that ID list and a determination 708 is made as to whether the next IDs are the same for all ID lists.

Figure 8:
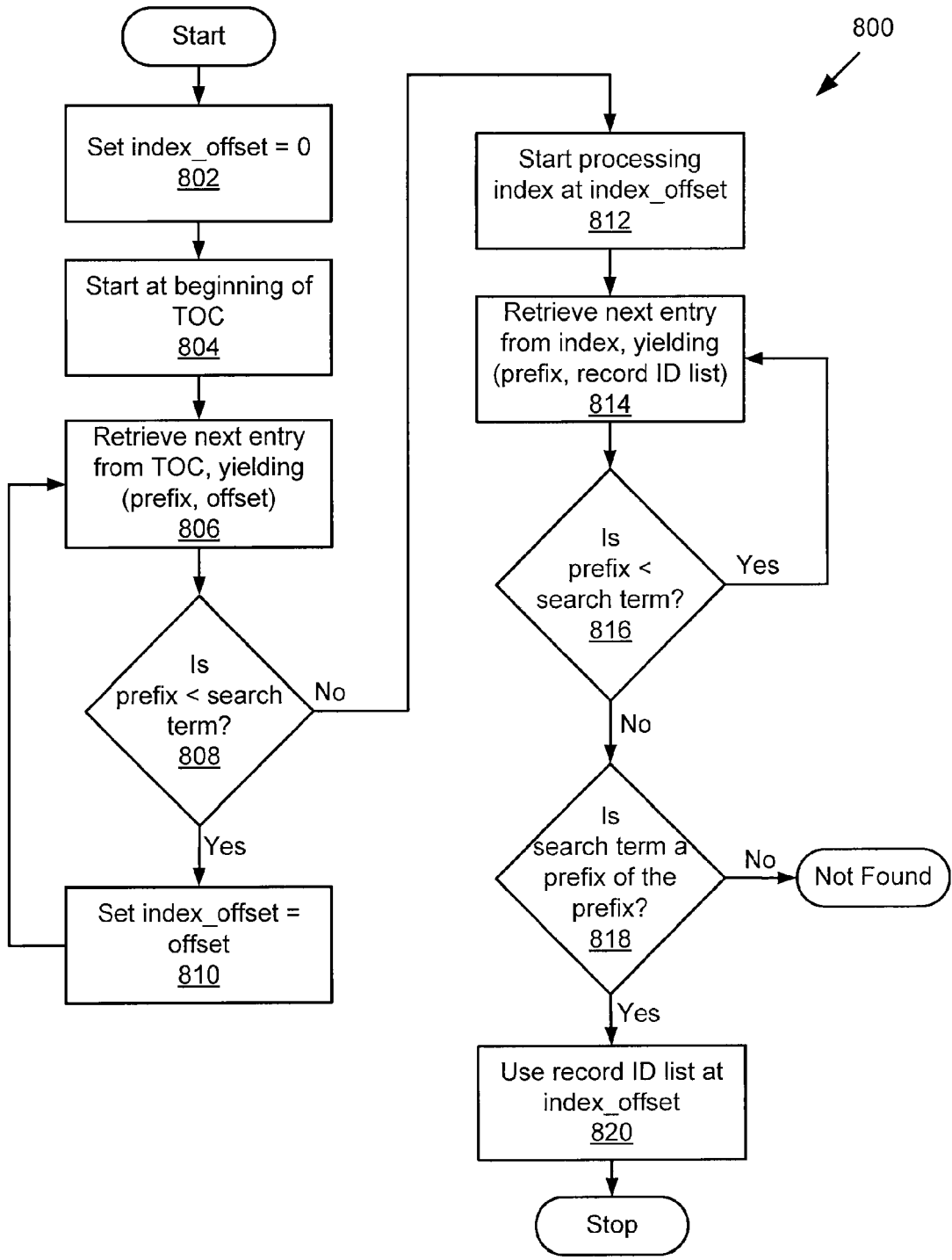
FIG. 8 is a flowchart illustrating a process for sending interactive search results in accordance with some embodiments.

FIG. 8 is a flowchart illustrating a process 800 for sending interactive search results in accordance with some embodiments. In particular, FIG. 8 is a detailed description of step 704 from FIG. 7 and illustrates the retrieval of a record ID list that corresponds to a given search term. The first part of the process 800 involves scanning the table of contents to find the largest entry that is no larger than the search term. An index offset is initialized 802 to the beginning of the index. The process is initialized 804 to start at the beginning of the table of contents. The next entry in the table of contents is retrieved 806, thus yielding a prefix and an offset into the index. A determination 808 is made as to whether the prefix is less than the search term. If the prefix is smaller than the search term (808-Yes), then the index offset is set to the offset that was retrieved from the table of contents and the process repeats at step 806.

If the prefix is not smaller than the search term (808-No), then the index is processed 812 at the index offset and the table of contents scan is complete. The next entry from the index is retrieved 814. A determination 816 is made as to whether the prefix is smaller than the search term. If the prefix is smaller than the search term (816-Yes), the process repeats at step 814.

If the prefix is greater than the search term (816-No), the scanning of the index is completed and a determination 818 is made as to whether the search term is prefix of the prefix. If the search term is a prefix of the prefix, then the record ID list is used 820 at the index offset. If the search term is not a prefix of the prefix, then no match is found for the particular search term.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing multi-prefix, interactive search capabilities on a mobile communications device through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An interactive multi-prefix and multi-tier search system, comprising a non-transitory computer-accessible storage medium, that searches a database of content items across a plurality of channels, each channel representing a category of content items within the database, the system comprising:
    (a) a multi-prefix word index, generated by the system and embodied in a non-transitory computer-accessible storage medium, that contains:
        (i) a list of content items, each content item having an associated unique identifier;
        (ii) a list of words, each word having an associated list of content items containing that word; and
        (iii) a list of prefixes, each prefix having an associated list of content items containing words having that prefix, and indices identifying the location within such content item of the words containing that prefix;
    (b) a multi-prefix search module, generated by the system and embodied in a non-transitory computer-accessible storage medium, that receives keystrokes as they are entered by a user into a device, and searches the multi-prefix word index for content items within the database that contain words having a prefix matching the keystrokes;
    (c) a multi-tier search module, generated by the system and embodied in a non-transitory computer-accessible storage medium, that limits a first search, including a first set of keystrokes, to a first tier of content that contains names of channels in the database, and, upon receiving an indication of the user's selection of the name of a first channel, limits a second search, including a second set of keystrokes, to a second tier of content that contains items within the category represented by the name of the first channel; and
    (d) a search result delivery module, generated by the system and embodied in a non-transitory computer-accessible storage medium, that delivers the matching content items generated by the multi-prefix search module to the device for display to the user.

2. The system of claim 1, wherein:
    (a) each sequence of keystrokes separated by a prefix delimiter represents a distinct prefix to be matched to the beginning portion of words within the content items; and
    (b) each content item containing at least one word matching each distinct prefix is considered a matching content item.

3. An interactive multi-prefix and multi-tier search system, comprising a non-transitory computer-accessible storage medium, that searches a database of content items across a plurality of channels, each channel representing a category of content items within the database, the system comprising:
    (a) a multi-prefix word index, generated by the system and embodied in a non-transitory computer-accessible storage medium, that contains:
        (i) a list of content items, each content item having an associated unique identifier;
        (ii) a list of words, each word having an associated list of content items containing that word; and
        (iii) a list of prefixes, each prefix having an associated list of content items containing words having that prefix, and indices identifying the location within such content item of the words containing that prefix;
    (b) a multi-prefix search module, generated by the system and embodied in a non-transitory computer-accessible storage medium, that receives keystrokes as they are entered by a user into a device, and searches the multi-prefix word index for content items within the database that contain words having a prefix matching the keystrokes, wherein:
        (i) each sequence of keystrokes separated by a prefix delimiter represents a distinct prefix to be matched to the beginning portion of words within the content items; and
        (ii) each content item containing at least one word matching each distinct prefix is considered a matching content item;
    (c) a multi-tier search module, generated by the system and embodied in a non-transitory computer-accessible storage medium, that limits a first search, including a first set of keystrokes, to a first tier of content that contains names of channels in the database, and, upon receiving an indication of the user's selection of the name of a first channel, limits a second search, including a second set of keystrokes, to a second tier of content that contains items within the category represented by the name of the first channel; and
    (d) a search result delivery module, generated by the system and embodied in a non-transitory computer-accessible storage medium, that delivers the matching content items generated by the multi-prefix search module to the device for display to the use.

4. A method for conducting an interactive multi-prefix and multi-tier search of a database of content items across a plurality of channels, each channel representing a category of content items within the database, the method comprising the following steps:
    (a) generating a multi-prefix word index that contains:

(i) a list of content items, each content item having an associated unique identifier;

(ii) a list of words, each word having an associated list of content items containing that word; and (iii) a list of prefixes, each prefix having an associated list of content items containing words having that prefix, and indices identifying the location within such content item of the words containing that prefix;

(b) generating a multi-prefix search module that receives keystrokes as they are entered by a user into a device, and searching the multi-prefix word index for content items within the database that contain words having a prefix matching the keystrokes;

(c) generating a multi-tier search module that limits a first search, including a first set of keystrokes, to a first tier of content that contains names of channels in the database, and, upon receiving an indication of the user's selection of the name of a first channel, limiting a second search, including a second set of keystrokes, to a second tier of content that contains items within the category represented by the name of the first channel; and (d) generating a search result delivery module that delivers the matching content items to the device for display to the user.

5. The method of claim 4, wherein:

(a) each sequence of keystrokes separated by a prefix delimiter represents a distinct prefix to be matched to the beginning portion of words within the content items; and (b) each content item containing at least one word matching each distinct prefix is considered a matching content item.

6. A method for conducting an interactive multi-prefix and multi-tier search system that searches a database of content items across a plurality of channels, each channel representing a category of content items within the database, the method comprising the following steps:

(a) generating a multi-prefix word index that contains:

(i) a list of content items, each content item having an associated unique identifier;

(ii) a list of words, each word having an associated list of content items containing that word; and (iii) a list of prefixes, each prefix having an associated list of content items containing words having that prefix, and indices identifying the location within such content item of the words containing that prefix;

(b) generating a multi-prefix search module that receives keystrokes as they are entered by a user into a device, and searching the multi-prefix word index for content items within the database that contain words having a prefix matching the keystrokes, wherein:

(i) each sequence of keystrokes separated by a prefix delimiter represents a distinct prefix to be matched to the beginning portion of words within the content items; and (ii) each content item containing at least one word matching each distinct prefix is considered a matching content item;

(c) generating a multi-tier search module that limits a first search, including a first set of keystrokes, to a first tier of content that contains names of channels in the database, and, upon receiving an indication of the user's selection of the name of a first channel, limiting a second search, including a second set of keystrokes, to a second tier of content that contains items within the category represented by the name of the first channel; and (d) generating a search result delivery module that delivers the matching content items to the device for display to the user.

7. An interactive multi-tier search system, comprising a non-transitory computer-accessible storage medium, that searches a database of content items across a plurality of channels, each channel representing a category of content items within the database, the system comprising:

(a) a word index, generated by the system and embodied in a non-transitory computer-accessible storage medium, that contains:

(i) a list of content items, each content item having an associated unique identifier; and (ii) a list of words, each word having an associated list of content items containing that word;

(b) a search module, generated by the system and embodied in a non-transitory computer-accessible storage medium, that receives keystrokes as they are entered by a user into a device, and searches the word index for content items within the database that contain words matching the keystrokes;

(c) a multi-tier search module, generated by the system and embodied in a non-transitory computer-accessible storage medium, that limits a first search, including a first set of keystrokes, to a first tier of content that contains names of channels in the database, and, upon receiving an indication of the user's selection of the name of a first channel, limits a second search, including a second set of keystrokes, to a second tier of content that contains items within the category represented by the name of the first channel; and (d) a search result delivery module, generated by the system and embodied in a non-transitory computer-accessible storage medium, that delivers the matching content items generated by the search module to the device for display to the user.

8. A method for conducting an interactive multi-tier search of a database of content items across a plurality of channels, each channel representing a category of content items within the database, the method comprising the following steps:

(a) generating a word index that contains:

(i) a list of content items, each content item having an associated unique identifier; and (ii) a list of words, each word having an associated list of content items containing that word;

(b) generating a multi-prefix search module that receives keystrokes as they are entered by a user into a device, and searching the word index for content items within the database that contain words matching the keystrokes;

(c) generating a multi-tier search module that limits a first search, including a first set of keystrokes, to a first tier of content that contains names of channels in the database, and, upon receiving an indication of the user's selection of the name of a first channel, limiting a second search, including a second set of keystrokes, to a second tier of content that contains items within the category represented by the name of the first channel; and (d) generating a search result delivery module that delivers the matching content items to the device for display to the use.

\* \* \* \* \*